(No Model.)
F. M. BRIGGS.
GATE.
No. 302,541. Patented July 29, 1884.
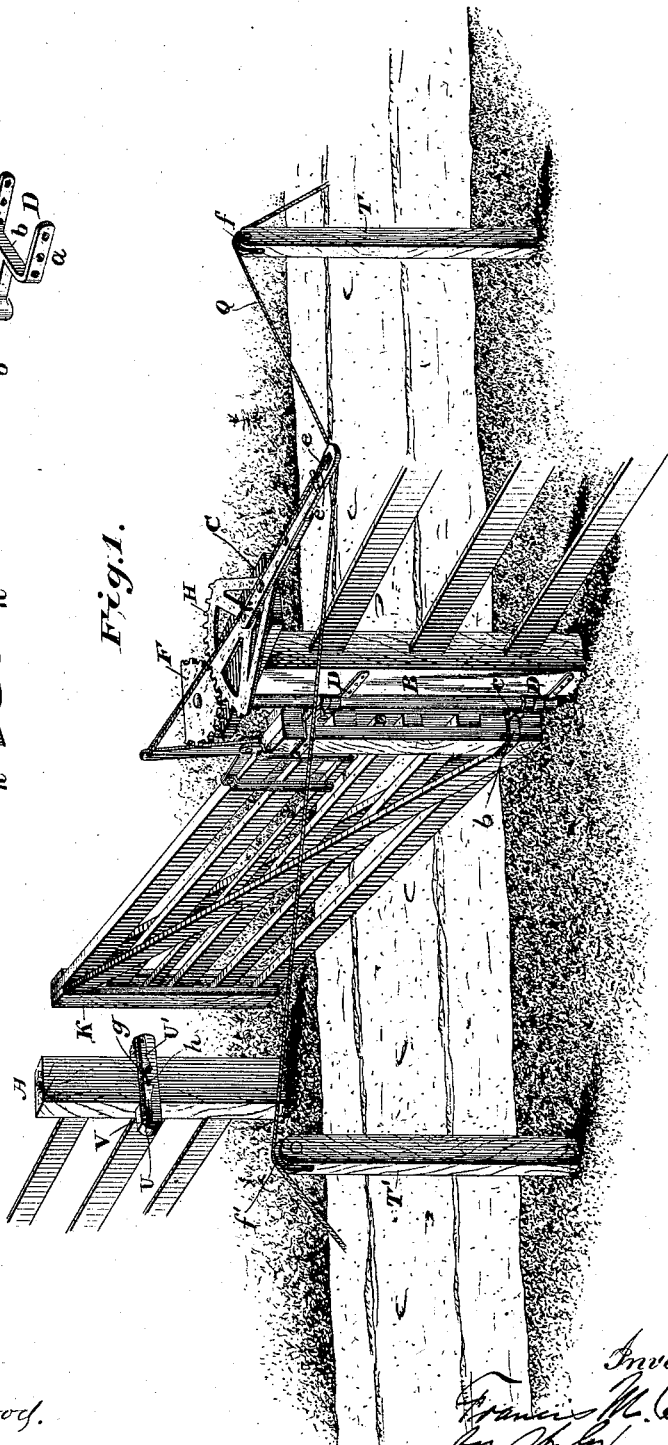

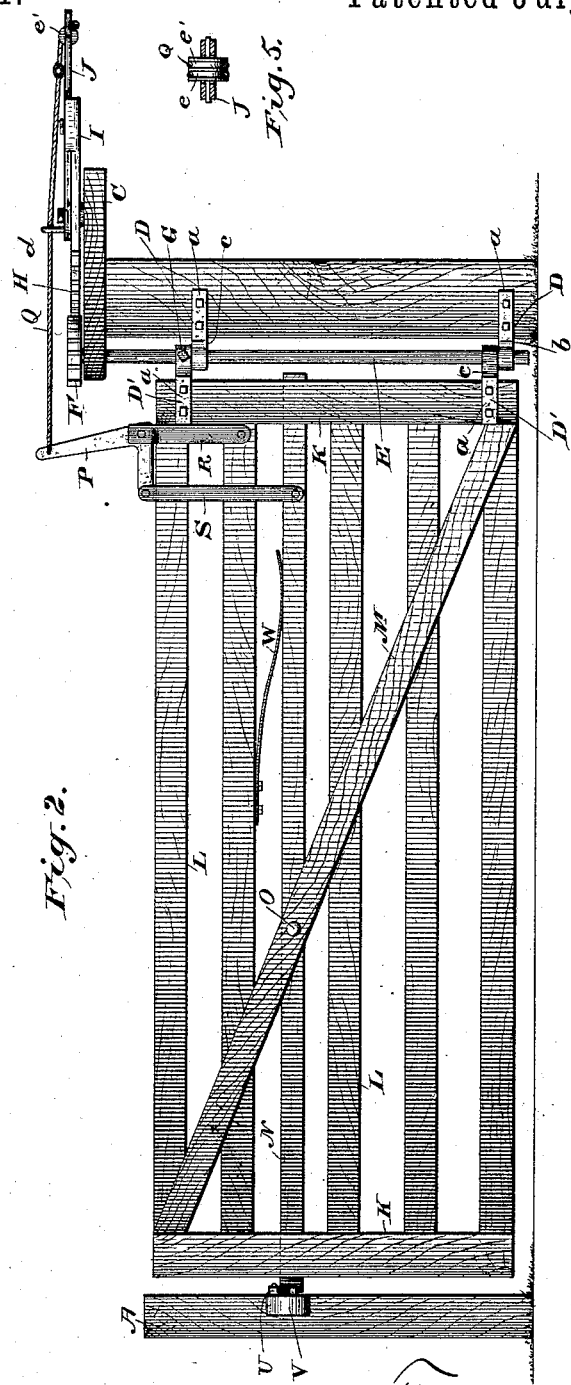

UNITED STATES PATENT OFFICE.

FRANCIS M. BRIGGS, OF EDON, OHIO, ASSIGNOR OF ONE-HALF TO WILLIAM A. COOK, OF SAME PLACE.

GATE.

SPECIFICATION forming part of Letters Patent No. 302,541, dated July 29, 1884.

Application filed August 31, 1883. (No model.)

*To all whom it may concern:*

Be it known that I, FRANCIS M. BRIGGS, a citizen of the United States, residing at Edon, in the county of Williams and State of Ohio, have invented certain new and useful Improvements in Gates; and I do declare the following to be a full, clear, and exact description of the invention, such as will enable others skilled in the art to which it appertains to make and use the same, reference being had to the accompanying drawings, and to the letters and figures of reference marked thereon, which form a part of this specification, and in which—

Figure 1 is a perspective of the gate partially opened. Fig. 2 is a side elevation thereof closed. Figs. 3 and 4 are detailed views of the pawls and hinges, and Fig. 5 a cross-section through the lever J, showing the pulleys therein.

My invention relates to swinging gates, and has for its object the production of a gate which will be simple in construction, easy to operate, and strong and durable in use; and it consists in the construction and combination, hereinafter particularly described, and then sought to be specifically defined by the claims, whereby the gate can be adjusted vertically and held to the desired adjustment.

In the accompanying drawings, the letters A and B indicate the two end posts of the gate, the former being provided with the catch devices, and the latter having the gate hinged thereto. The post B has a block or plate, C, bolted to its top, and straps D bolted or otherwise suitably fastened to its sides, one near the top and the other near the bottom thereof. These straps may be made of cast or wrought iron, and are formed with side flanges, $a$, and intermediate connecting-bar, $b$, so as to bear against three sides of the post and with an outwardly-extending arm, $c$, having an eye formed vertically through it for the reception of a rod. Similarly-constructed straps D' are secured to the end of the gate, so as to be above the straps D, and a rod, E, having a pinion, F, preferably of segmental form, secured to its upper end, is passed through the plate C and the eyes of the straps, so as to hinge the gate to the post.

The rod may rest in a step below it, or it may be suspended by the pinion, or by a collar or shoulder formed on the under face of the pinion around the rod resting upon the plate. The gate hinged, as described, can be raised or lowered on the rod to any desired height and will be held to its adjustment by a set-screw, G, passed through the eye of the strap D'. This screw also holds the gate rigidly to the rod, so that it will turn therewith. A segmental gear, H, is pivoted to the top of plate C, so that its teeth will mesh with those of the pinion F. The rear of this segmental gear H is extended so as to form an arm, I, the sides of which are flanged and to which, between the flanges, there is bolted a lever, J. By moving the lever backward or forward the gate is swung to open or close. The gate is composed of upright end bars, K, longitudinal bars L fitting between them, and diagonal brace-bars M. A latch-bar, N, passes between the diagonal bars and is pivoted to them by means of a bolt, O. The pivotal point is preferably nearer the front end of the bar than its rear end, so that the rear end may hang down and thereby hold up the front end in contact with the catch devices. The latch-bar also passes between the upright end bars, and by them is firmly held against any lateral wrenching, and its forward end projects beyond the end bars, so as to form a tongue to engage with the catch. The bar is operated through a bell-crank lever, P, and the rope or chain Q. The bell-crank lever is pivoted at its angle between and to the brace-straps R, which are bolted to the two upper rails of the gate, and its short arm is connected to the rear part of the latch-bar by means of the straps S, which are jointed at one end to the lever and bolted at the other end to the bar. The chain or rope Q is connected to the end of the long arm of the crank-lever, and passes from thence through a guide, $d$, on the lever J, and thence over pulleys connected to the end of the lever, one section of the rope or chain passing around the pulley $e$, and thence forward to a post, T, in line with post B, and around the pulley $f$ connected thereto, while the other section passes around the pulley $e'$, and thence forward to a post, T', also in line with post B and around the pulley $f'$ connected thereto. The distance between the post B and each of the outer posts, T T', is such that when the driver of a team is within reaching distance of the chain Q, with his horses facing the gate, there will be space enough between the horses and gate to permit the gate to be swung to a right angle to its closed position without striking the horses. By drawing or pulling on one end of the chain the crank-lever will first be drawn back, thereby raising the rear and lowering the front end of the latch-bar and releasing it from engagement with the catch devices, and then the segmental gear will turn and revolve the pinion-rod so as to swing open the gate. After the team has passed through as far as the next outer post the driver pulls the other end or section of the chain, when the movement of the parts is reversed and the gate swung closed and held so by the engagement of the tongue of the latch-bar with the catch devices. The catch devices consist of the two pawls, U U', which are beveled on their lower faces so as to present an incline from their outer to their inner ends, and at their inner ends are recessed so as to form lugs $g$ at their top edge. These pawls are pivoted at their outer ends to a cross-bar, V, attached to the post B, (or to the post itself, if its face be wide enough to admit thereof,) and rest at their inner ends by lugs $g$ on pins $b$ driven into the bar. By constructing and pivoting the pawls as described, they are free to rise and fall at their inner ends. When the latch-bar is in its normal position, and the gate swung closed from either direction, the tongue of the bar will strike the inclined surface of one of the pawls and gradually raise the same till the tongue passes into the recess of the pawl, when the pawl will fall and the tongue be held immovable between the pawls, and can be released therefrom only by depressing it in the operation of opening the gate.

Instead of depending on gravity to lower the rear end of the latch-bar and raise its forward end, so that it will engage with the catches, I connect a spring, W, to one of the longitudinal bars of the gate, so that it will bear down on the rear end of the latch-bar, and when the operating chain is slackened the spring will immediately force down the bar, so as to insure the engagement of the tongue with the pawls.

I have described the best means known to me at this time for carrying out my invention, but do not wish to be understood as confining myself to the details of construction in the parts described, as departures therefrom can be made without going beyond the scope of my invention.

Having described my invention and set forth its merits, what I claim is—

1. The combination of the post provided with the eye-straps, the gate provided with the eye-straps above the straps of the post, the rod provided with the pinion at its upper end and passed loosely through the eyes of the straps of the post so as to turn therein, the gear meshing with the pinion, and the set-screw passed through an eye-strap of the gate with its point bearing against the supporting-rod, whereby the gate can be adjusted on the rod and clamped rigidly thereto, substantially as set forth.

2. The combination of the revolving rod provided with the pinion at its upper end, the gate supported by said rod, the pivoted crank-lever, the latch-bar pivoted to the gate and connected with the crank-lever, the gear meshing with the pinion, the rope or chain connecting the crank-lever and gear and passing over side posts, and adapted, when pulled, to turn the crank-lever to unlatch the gate and move the gear to swing open the gate, a spring bearing on the latch-bar to restore the lever and latch-bar to their normal positions, and catches for the bar to engage with, substantially as set forth.

In testimony whereof I affix my signature in presence of two witnesses.

FRANCIS M. BRIGGS.

Witnesses:
 CHARLES A. BUERR, Sr.,
 EZRA D. HARTMAN.